Figure 1:
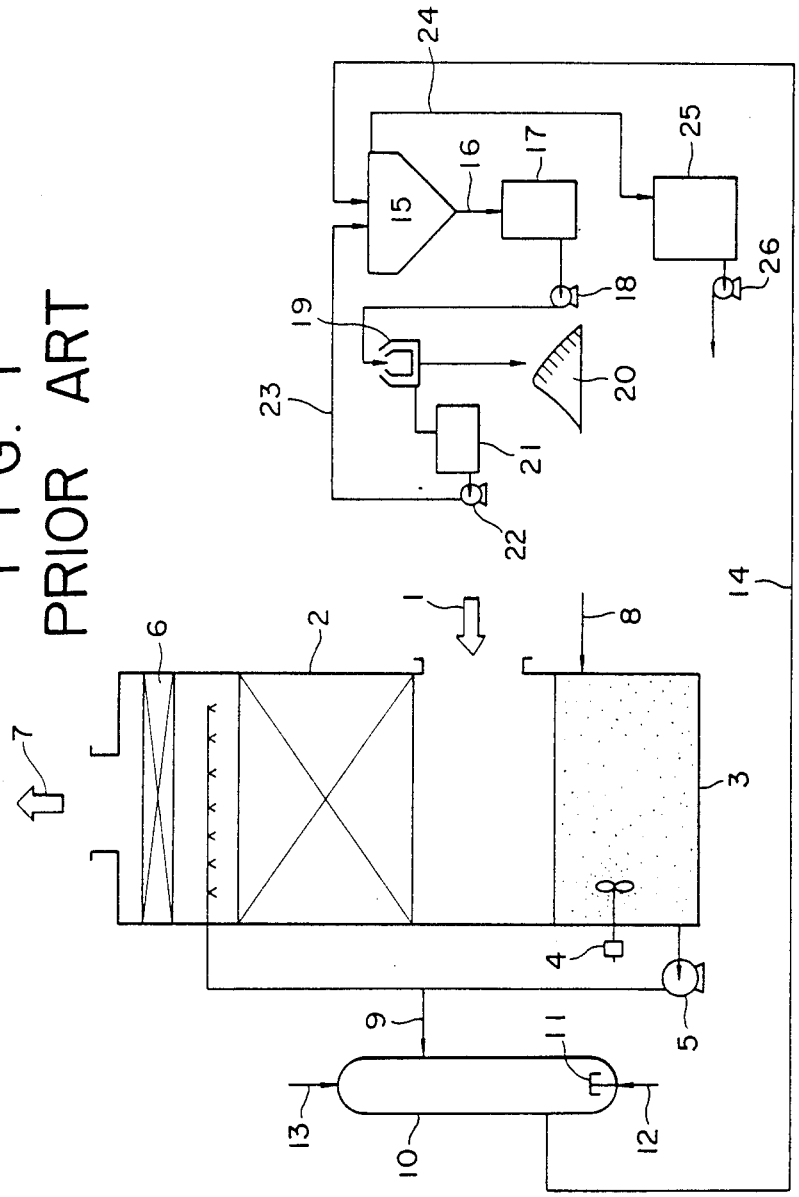

United States Patent [19]

Shinoda et al.

[11] Patent Number: 4,632,810
[45] Date of Patent: Dec. 30, 1986

[54] METHOD FOR TREATING WASTE GAS TO SEPARATE AND RECOVER GYPSUM AND DUST THEREIN

[75] Inventors: Naoharu Shinoda; Atsushi Tatani; Naohiko Ukawa; Masakazu Onizuka, all of Hiroshima; Taku Shimizu, Tokyo, all of Japan

[73] Assignee: Mitsubishi Jukogyo Kabushiki Kaisha, Tokyo, Japan

[21] Appl. No.: 706,117

[22] Filed: Feb. 27, 1985

[30] Foreign Application Priority Data

Feb. 28, 1984 [JP] Japan ................................. 59-35177

[51] Int. Cl.$^4$ ............................................. C01B 17/00
[52] U.S. Cl. .................................... 423/242; 423/166; 423/555
[58] Field of Search .......... 423/242 A, 242 R, 244 A, 423/244 R, 166, 555

[56] References Cited

U.S. PATENT DOCUMENTS

| | | | |
|---|---|---|---|
| 3,903,243 | 9/1975 | Atsukawa et al. | 423/555 |
| 3,929,968 | 12/1975 | Taub | 423/242 |
| 4,080,428 | 3/1978 | Holter et al. | 423/166 |
| 4,487,784 | 12/1984 | Kurota et al. | 423/555 |
| 4,579,069 | 4/1986 | Gay et al. | 423/242 |

FOREIGN PATENT DOCUMENTS 3218470  8/1983  Fed. Rep. of Germany ...... 423/242

*Primary Examiner*—Gregory A. Heller
*Attorney, Agent, or Firm*—Holman & Stern

[57] ABSTRACT

The present invention is directed to a method for treating a waste gas to separate and recover gypsum and a dust therein, characterized by comprising the steps of causing the waste gas to pass through a dry dust collector; introducing the gas into a gas absorber, in which a slurry containing at least one of calcium hydroxide or calcium carbonate as an absorbent is employed to remove $SO_2$ and the dust passed through the dry dust collector from the waste gas; blowing air into the resultant absorbing liquid in the gas absorber to oxidize the absorbing liquid and to thereby produce gypsum; delivering them to an absorbing liquid tank, in which the slurry mainly containing the gypsum grains is separated from the other slurry mainly containing the dust by partition walls disposed therein; and directly taking out the respective slurries separately from the absorbing liquid tank.

2 Claims, 2 Drawing Figures

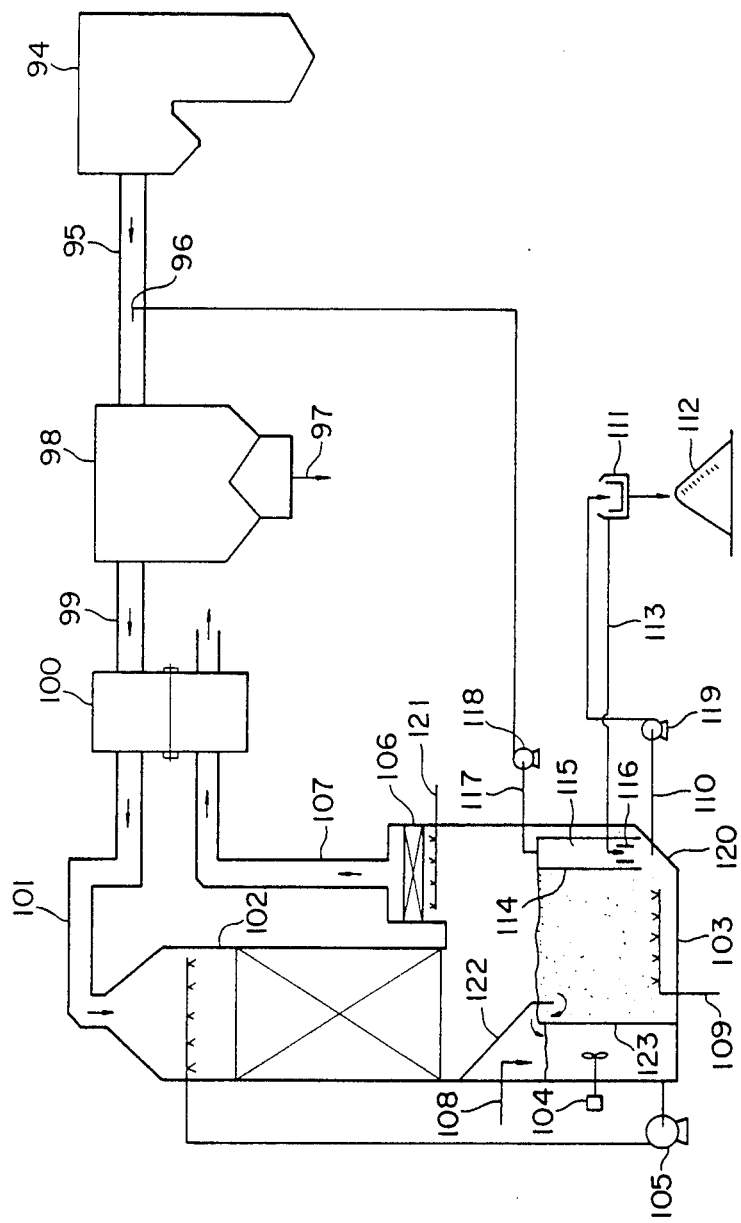

METHOD FOR TREATING WASTE GAS TO SEPARATE AND RECOVER GYPSUM AND DUST THEREIN

The present invention relates to an improvement of a fume-exhausting and desulfurizing method in a wet lime/gypsum system, and more specifically, to a method for separating a dust component in a waste gas from produced gypsum.

A fume-exhausting and desulfurizing apparatus which is employed prevalently at the present time makes use of a so-called wet lime method, which comprises carrying out fume exhaustion and desulfurization with the aid of an absorbent such as $CaCO_3$ or $Ca(OH)_2$, and recovering sulfur in the form of calcium sulfite or calcium sulfate (gypsum). Such an apparatus as mentioned above is disclosed, for example, in Japanese Patent Provisional Publication No. 63117/1982 and many other publications.

Now, reference will be made to the fume-exhausting and desulfurizing apparatus which is now widely employed on an industrial scale, in accordance with FIG. 1 attached thereto.

In the first place, fumes 1 containing $SO_2$ are guided to an absorbing tower body 2. Under the absorbing tower body 2, there is disposed a tank 3 for receiving a slurry in which calcium compounds are suspended, and the tank 3 is provided with an agitator 4 for agitating the slurry so as to prevent a solid material from precipitating therein. The slurry containing the suspended calcium compounds therein is delivered to the top of the absorbing tower 2 by means of a circulating pump 5 and is sprayed into the tower. Afterward, the slurry drops while brought into contact with fumes in the absorbing tower and returns to the tank 3. The fumes from which $SO_2$ has been removed due to the contact with the slurry are discharged as a purified gas 7 through a mist eliminator 6.

On the other hand, the slurry of an absorbent such as $CaCO_3$ or $Ca(OH)_2$ is fed, in an amount enough to absorb $SO_2$, to the tank 3 through a line 8, so that calcium sulfite is produced by absorbing $SO_2$, and the slurry containing calcium sulfite is then delivered to an oxidizing tower 10 through a line 9. Into the oxidizing tower 10, air 12 is blown through an air bubble-evolving device 11 fixed on the bottom thereof, and sulfuric acid is fed to the tower 10 through a line 13, whereby calcium sulfite is oxidized to gypsum and unreacted $CaCO_3$ or $Ca(OH)_2$ is also converted into the gypsum in the oxidizing tower 10.

The thus produced gypsum slurry is then forwarded from the tower 10 to a thickener 15 through a line 14. The gypsum slurry concentrated therein is then delivered to a centrifugal separator 19 via a line 16, a tank 17 and a pump 18. In the cetrifugal separator 19, the gypsum is separated from a filtrate, and the gypsum 20 is taken out therefrom and the filtrate is returned to the above-mentioned thickener 15 via a tank 21, a pump 22 and a line 23.

On the other hand, a supernatant liquid in the thickener 15 is delivered to a tank 25 through a line 24, and a part of the liquid is then discharged from the tank 25. The remaining liquid is used in the fume-exhausting and desulfurizing apparatus, for example, in order to prepare the absorbent.

According to the system shown in FIG. 1, the dust contained in the fumes 1 is incorporated into the slurry absorbing liquid and thus further into the gypsum 20, therefore a quality of the gypsum will deteriorate. For this reason, it has been suggested that a cooling type dust-removing tower is provided on the absorbing tower on its upstream side for the purpose of previously removing the dust from the waste gas, and such a system is now widely put to practical use and is disclosed, for example, in Japanese Patent Publication Nos. 10838/1977 and 12026/1976.

As understood from the foregoing, drawbacks of the conventional techniques are that the low-quality gypsum containing the dust therein is recovered and that in an alternative case, the cooling type dust-removing tower is additionally required to be disposed so as to restrain the contamination of the secondarily produced gypsum with the dust. A further drawback is, as be definite from FIG. 1, that there are separately and independently needed operative processes such as the oxidation, the precipitation and concentration of the gypsum, and the recovery of the supernatant liquid, which fact makes the treating method intricate. In other words, the conventional concepts can be considered to be poor in economy. In addition, the most disadvantage of the conventional wet waste gas-treating methods is that a drainage operation is indispensable.

In the case of the conventional wet waste gas-treating techniques, the dust and impurities such as HCl and HF in the waste gas are collected in the absorbing liquid, and the liquid containing them is discharged as a waste liquid through another route than that of the gypsum. Accordingly, needless to say, the treatment of the waste liquid is essential from the viewpoint of the prevention of a secondary environmental pollution. With regard to the already disclosed wet waste gas-treating techniques, it is to be understood that they indispensably require the drainage, even if no drain operation is referred to anywhere therein.

As be definite from the above, the drawbacks of the conventional fume-exhausting and desulfurizing method in the wet lime/gypsum system can be summarized at least as follows:

(1) The contamination of the secondarily produced gypsum with the dust.

(2) The additional disposition of the independent cooling type dust-removing tower in the case that it is necessary to recover the dust-free secondary gypsum product.

(3) The necessity of the respective independent processes of the oxidation, the precipitation and concentration of the gypsum, and the recovery of the supernatant liquid within the range of operative steps of the absorption of $SO_2$ to the recovery of the by-product gypsum.

(4) The essential treatment of the waste liquid containing impurities derived from the waste gas and the like.

The present invention has been accomplished to overcome the above-mentioned drawbacks, and its object is to provide a method for treating a waste gas which is characterized by separately taking out a slurry mainly containing gypsum grains and another slurry mainly containing a dust directly from an absorbing tank, and it should be noted that the method is based on data of a reaction rate of crystalline $CaCO_3$ or $Ca(OH)_2$ with $SO_2$, an oxidative reaction rate of calcium sulfite produced by absorbing $SO_2$, a sedimentation rate of a dust and a sedimentation rate of the gypsum, and in this method, there are gathered, into one process in an absorbing tower and a tank, all operations of absorption of SO₂, oxidation, separation of precipitated gypsum from the concentrated dust and recovery of a supernatant liquid, in contrast with the conventional concept of "one operation in one process". Another object of the present invention is to provide a method for treating a waste gas to separately recover a gypsum and dust, characterized by comprising the steps of spraying the slurry containing the dust into a high-temperature waste gas in order to form a dry solid material and causing the waste gas containing the formed solid material to pass through a dry dust collector, whereby the dust as well as the dry solid material are collected thereby.

Other objects, characteristics and advantages of the present invention will become more apparent from the following detailed description and accompanying drawings, in which:

FIG. 1 shows a flow chart of a conventional fume-exhausting and desulfurizing method in a wet lime system which is employed on an industrial scale; and FIG. 2 shows a flow chart of a wet fume-exhausting and desulfurizing method of the present invention.

The present invention will be described in reference to FIG. 2.

A waste gas is delivered from a coal-fired boiler 94 through a flue 95 to a dry dust collector 98, where most of a dust in the waste gas is removed therefrom. A concentration of the dust in the waste gas is, in a certain case, about 10 g/m³N at an inlet of the dry dust collector 98 and is about 500 mg/m³N at an outlet thereof. Afterward, the waste gas is guided to a heat exchanger 100 through a flue 99, in which the waste gas is cooled from about 140° C. to about 80° C. in order to recover some heat. The waste gas containing about 500 mg/m³N of the dust and about 1500 ppm of SO₂ is then delivered to an absorbing tower body 102 via a flue 101. FIG. 2 shows that exhaust fumes are contacted with an absorbing slurry in a so-called parallel flow, but such a gas-liquid contact may be accomplished in a counter-flow system as shown in FIG. 1.

A tank 103 for receiving the slurry including calcium compounds suspended therein is provided under the absorbing tower body 102. In the shown embodiment, the tank 103 has dividing plates 122 and 123 therein to separate the slurries, but it may have no dividing plates. When the dividing plates are present, an agitator 104 is used to agitate the slurries and to thereby prevent a solid material from depositing, but in the case of no dividing plates, the agitator can be omitted, since occurred air bubbles serve to agitate the slurry.

The slurry including the suspended calcium compounds is then forwarded to the top of the absorbing tower 102 by means of a circulating pump 105 and is sprayed into the tower. While brought into contact with the fumes in the absorbing tower 102, the slurry is returned to the tank 103 again.

The fumes, in which SO₂ has been removed by the contact with the slurry as mentioned above, are delivered to the heat exchanger 100 through a mist eliminator 106, and after their temperature rise in the heat exchanger 100, the fumes are discharged as a purified gas to the atmosphere through a flue 107. Measurement results indicate that the purified gas in the flue 107 contains about 100 ppm or less of SO₂ and 50 mg/m³N or less of the dust, which fact means that the absorbing liquid slurry takes in SO₂ and the dust. It should be noted that at the time of the absorption of SO₂ and the dust, HCl and HF which are present in an amount of several tens ppm in the fumes are also absorbed in the absorbing liquid slurry to a substantial degree.

On the other hand, a CaCO₃ or Ca(OH)₂ powder is fed to the tank 103 through a powder carrying line 108 in an amount enough to absorb SO₂. The CaCO₃ or Ca(OH)₂ compound as an absorbent may be fed to the tank 103 in the form of an aqueous suspended slurry. Calcium sulfite produced by the reaction of SO₂ with the absorbent is then oxidized by oxygen contained in the fumes to be converted into a gypsum crystal, since the slurry is maintained in an acidic state in the gas-liquid contact zone in which the parallel flow system is employed. At this time, calcium sulfite is all converted into the gypsum crystal sometimes, but generally some sulfite remains there as it is. Therefore, it is necessary to feed air through an air nozzle 109 for the sake of accelerating the oxidation, whereby all the sulfite is solidified in the form of the gypsum.

In the tank 103, the dust absorbed in the absorbing liquid is also present together with the slurry mainly containing the gypsum crystal which comprises the calcium compound. However, since such a dust in the tank 103 is that which has not been seized by the dry dust collector 98, each of its grains has as small a diameter as about 1 μ. As compared with the fact that a diameter of each gypsum grain is about 50 μ, the above-mentioned value of the dust diameter is much smaller. Such a large gap therebetween will lead to a difference of physical properties such as sedimentation rate and the like between both the grains. The present invention makes use of this difference, and it has consequently been achieved to separate the slurry mainly containing the gypsum grains from the slurry mainly containing the dust.

That is to say, the slurry mainly containing the gypsum is guided, via a slurry outlet 110 and a pump 119, to a separator 111, where the gypsum is made cake-like. In this case, however, it has been found that the slurry mainly containing the fine dust can be recovered through a line 113 and the gypsum cakes scarcely containing the fine dust can be obtained by selecting a filter fabric for the separator 111 and by adjusting its feed time. However, it has also been found that the slurry in the line 113 contains the gypsum besides the dust and the concentration of the gypsum cannot be controlled practically.

In short, when too much amount of the slurry is fed to the separator 111, the high-purity gypsum cake 112 containing a less amount of the dust can be recovered, but the gypsum as well as the dust inevitably tends to get into the separated liquid in the line 113, and what is worse, the contamination with the gypsum is difficult to control. After all, a quantity of the dust will accumulatively increase in the slurry in the tank 103. From the viewpoint of such circumstances, the present invention utilizes the difference of the sedimentation rates between the dust and gypsum, and employs a manner of taking out the slurry mainly containing the dust through a line 117.

In the tank 103, a partition wall 114 is provided which extends from the surface of the slurry liquid to a position under the same for the purpose of defining a liquid chamber 115 partitioned from the slurry being agitated. The bottom of the partition wall 114 is opened, so that the slurry being agitated by the agitator 104 and the other slurry in the liquid chamber 115 defined by the partition wall 114 can flow toward each other therethrough.

Further, as shown in FIG. 2, baffle boards 116 are fixed with the intention of preventing the slurry mainly containing the dust from becoming a turbulent state owing to a movement of the agitated slurry in the liquid chamber 115. The slurry mainly containing the dust is caused to leave the liquid chamber 115 and is then delivered to a pump 118 through a dust slurry outlet 117. The slurry returned through the line 113 is introduced into the liquid chamber 115 from its lower portion so as to flow in a downward direction and to thereby prevent the gypsum crystal from rising in the chamber 115. Further, a slanting plate 120 is disposed at a lower edge portion, of the tank 103, positioned under the liquid chamber 115, and allows the gypsum crystal to deposit and concentrate thereon. The above-mentioned slurry outlet is provided through this slanting plate 120.

According to such a constitution, the concentration of the gypsum crystal slurry which will be taken out by means of a pump 119 can be heightened, so that a wasteful energy to carry the liquid can be saved.

On the other hand, the slurry which will be forwarded to a further process by means of the pump 118 principally comprises the dust, and in this slurry, there additionally exist soluble components such as HCl and HF in the form of $Cl^-$ and $F^-$ ions which have been absorbed from the waste gas, and, of course, the saturatedly dissolved gypsum component is also present therein. When the slurry is sprayed into the waste gas having a high temperature of about 150° C. through a spray nozzle 96 disposed in the flue 95, water in the slurry will evaporate in as short a period of time as a few seconds, thereby forming a dry solid material mainly containing the dust.

The main component of the above dry solid material is the dust which has passed once through the dry dust collector 98, but grains of the thus formed dry solid material are cohesively enlarged by evaporation to dryness. Therefore, the newly prepared dry solid material the grains of which are enlarged can be seized by the dry dust collector 98 this time. This advantage can be obtained only by the present invention. As described above, the fine dust cannot be seized by the dry dust collector alone, but its seizure becomes possible by combining the collector with the wet fume-exhausting and desulfurizing technique. Therefore, the dry dust collector can be utilized more economically than in the conventional cases. Further, another great feature of the present invention is that the drainage treatment formerly required can be omitted.

The mist collected by the mist eliminator 106 contains calcium compounds, and crystals of the latter tend to deposit on the eliminator 106 in order to clog gas flow paths therein. In the wet fume-exhausting and desulfurizing apparatus, therefore, washing water is jetted through a nozzle 121 to prevent such clogging. Moreover, seal water for the pumps is required. A great deal of these waters is collected in the tank 103 and thus makes the concentration of the slurry unstable. A variation in the slurry concentration will cause an operative control of the wet fume-exhausting and desulfurizing apparatus to be unsettled, and an alteration in the crystal concentration will bring about scale troubles. These problems still remain unsolved at the present time, and in the wet fume-exhausting and desulfurizing apparatus in which the slurry containing the suspended calcium compounds is treated, an inhibition of the scale is a serious problem. The inventors of the present application have found by researches that a chief cause of the scale trouble is the variation in the slurry concentration due to the addition of much water.

According to the present invention, there are simultaneously carried out two operations of discharging, from the tank in the wet fume-exhausting and desulfurizing apparatus, the slurry in which the crystals of the calcium compounds are suspended, and discharging, from the tank, the supernatant liquid containing the calcium compounds in a dilute concentration, whereby the concentration of the calcium compound slurry can be stably controlled in the wet fume-exhausting and desulfurizing apparatus. This is an additional advantage of the present invention.

EXAMPLE

This example was carried out using a system shown in FIG. 2.

A tank 103 for collecting a slurry containing gypsum crystals had a cross section of 2000 mm × 2000 mm and a depth of 2000 mm. A circulating pump 105 served to deliver the slurry to the top of an absorbing tower 102 and to spray it into the interior of the tower at a rate of 60 m³/h, and the absorbing tower was packed with grids.

A waste gas discharged from a coal-fired boiler was introduced into an electrical dust collector (EP) 98 for experiment through a flue 95 at a rate of 4,000 m³N/h, and then into an absorbing tower 102 through a heat exchanger 100 and a flue 101. Adjustment was carried out so that the concentration of a dust at an inlet of EP might be within the range of about 10 to 15 g/m³N and so that the concentration of the dust at an outlet of EP might be at a level of about 500 mg/m³N.

The concentration of $SO_2$ in the gas was about 1500 ppm at an inlet of the absorbing tower.

A $CaCO_3$ powder as an absorbent was fed to the tank 103 through a line 108 in an amount enough to absorb $SO_2$, and a pH of the slurry to be sprayed from the top of the absorbing tower was adjusted so as to be a predetermined value within the range of 4.5 to 6.0. Dividing plates 122 and 123 were disposed in the tank 103 to divide the slurry into two portions in the tank, so that the circulating slurry which was allowed to drop while absorbing $SO_2$ was brought into contact with air bubbles once and was allowed to flow toward a circulating pump 105 as shown by arrows in the drawing.

Further, in the tank 103, there were successively disposed four kinds of cylindrical partition walls 114 the bottoms of which are opened, each partition wall having an inner diameter within the range of 100 to 400 mm and a length of 1500 mm. A line 117 directly connected to a suction pump 118 is provided on a cylindrical upper lid of each partition wall. Sampling of the slurry streaming from a liquid chamber 115 was carried out while an amount of the slurry sucked by the pump was suitably varied. When an average rising velocity of a liquid level of the liquid slurry in the liquid chamber 115 was varied ranging from 0.1 m/h to 3 m/h, the concentration of a solid material in the thus prepared slurry samples ranged from 0.2 to 3 wt %. Observation by the use of a microscope made it definite that the solid material mainly comprised a spherical dust. In consequence, it was confirmed that when the rising velocity of the liquid level was high, the amount of the contaminating gypsum grains would increase.

During this experiment, the concentration of $SO_2$ present in the waste gas in a flue 107 depended on a pH value of the slurry circulating through the absorbing tower, but was generally within the range of 10 to 100 ppm, and the average concentration of the dust therein was 30 mg/m³N. It was confirmed that in a steady state, the recovered gypsum from the separator 111 had as high a purity as 97% by weight in terms of dry weight, and the dust was selectively drawn from the line 117.

Air was blown into the tank 103 through an air nozzle 109 disposed on the tank itself at a rate of 50 m³N/h to 600 m³N/h, but in the case that the blowing rate of air was 250 m³N/h or more, the concentration of a sulfite was as low as less than 1 mmol/l; in the case of less than 250 m³N/h, the concentration of soluble sulfite ions increased to 1 mmol/l and more along with the decrease in an air amount. Simultaneously, a pH value of the absorbing liquid began to lower, so that a dissolving rate of $CaCO_3$ absorbent grains also lowered. As a result, it was also observed that the concentration of unreacted $CaCO_3$ increased. Accordingly, air was required to be blown thereinto at a rate of 50 m³N/h or more.

Further, the concentration of the gypsum grains collected in the tank 103 could be controlled at a desired level within the range of 1 to 35% by weight by adjusting a flow rate of the slurry discharged from an outlet 110.

Afterward, the slurry mainly containing the dust solid material, which passed through the line 117 and the pump 118, was sprayed into the streaming waste gas having a temperature of about 150° C. through a spray nozzle 96 in the flue 95. A spray flow rate of the slurry was 50 l/h, and the sprayed slurry was dried for about 3 seconds in the flue to form a dried solid material. This solid material was collected by EP. It was confirmed that a temperature of the waste gas dropped only by about 10° C.

According to the present invention, there can be omitted a cooling dust-removing device, an oxidizing tower, a thickener, a filtrate tank, a supernatant liquid tank, and pumps, valves and accessories affixed to these members which have been necessary in conventional wet fume-exhausting and desulfurizing apparatus. Further, the present invention does not require any drainage treatment which has been the most troublesome drawback in the conventional techniques, which fact permits remarkably simplifying the treating process.

Moreover, according to the present invention, since the secondarily produced gypsum and dust can be separately and independently taken out directly from the absorbing liquid tank, the high-quality gypsum can be recovered and the dust can also be regained in the form of the dry solid material.

What is claimed is:

1. A process of treating waste gas which includes, dust and $SO_2$, comprising the steps of:
   (a) spraying a slurry mainly containing dust into waste gas on the upstream side of a dry dust collector,
   (b) removing coarse dust and dried solid material resulting from spraying in step (a) while the waste gas flows through said dry dust collector, thereafter introducing the waste gas into a wet type absorbing unit, feeding said wet type absorbing unit with at least one of calcium hydroxide and calcium carbonate which serve as absorbent, thus removing $SO_2$ in the waste gas and fine dust in the wet type absorbing unit, said fine dust being such that it has passed through said dry dust collector,
   (c) blowing air into an absorbing liquid tank in which absorbing liquid to be fed to the wet type absorbing unit is stored, oxidizing said absorbing liquid to produce gypsum and preparing absorbing liquid in which a second slurry of fine dust particles and gypsum particles is contained, and
   (d) separating first slurry and second slurry from the thus prepared absorbing liquid while the latter is kept in the stirred state with a partition disposed in the absorbing liquid tank, said first slurry including mainly gypsum particles and said second slurry including mainly fine dust particles, thereafter taking out both of the first and second slurry separately from the absorbing liquid tank, and delivering said second slurry to step (a) without requiring treatment of drainage waste water and sludge in the process.

2. The process of claim 1 wherein a baffle board is provided in liquid chamber defined by said partition wall.

* * * * *